Feb. 9, 1960  G. E. SORENSEN  2,924,017
DIAL INDICATOR ON BEAM CALIPERS WITH
PROTECTED CONTACT POINT
Filed March 15, 1957  4 Sheets-Sheet 1

INVENTOR
George E. Sorensen
BY
ATTORNEY

Feb. 9, 1960

G. E. SORENSEN 2,924,017

DIAL INDICATOR ON BEAM CALIPERS WITH
PROTECTED CONTACT POINT

Filed March 15, 1957

INVENTOR
George E. Sorensen
BY
ATTORNEY

Feb. 9, 1960 G. E. SORENSEN 2,924,017
DIAL INDICATOR ON BEAM CALIPERS WITH
PROTECTED CONTACT POINT
Filed March 15, 1957 4 Sheets-Sheet 3
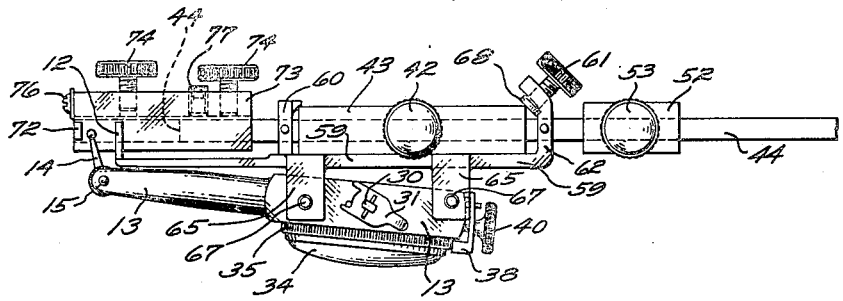
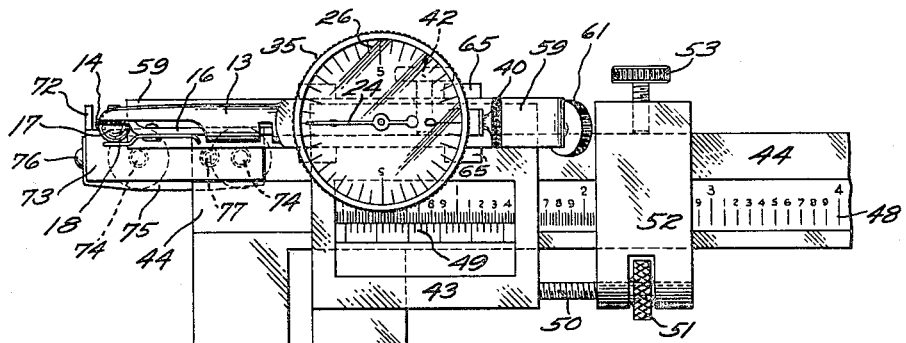
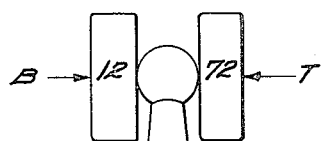
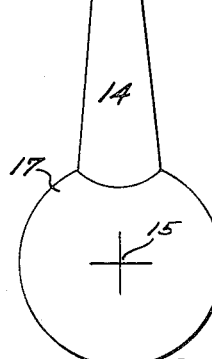
INVENTOR
George E. Sorensen
BY
ATTORNEY

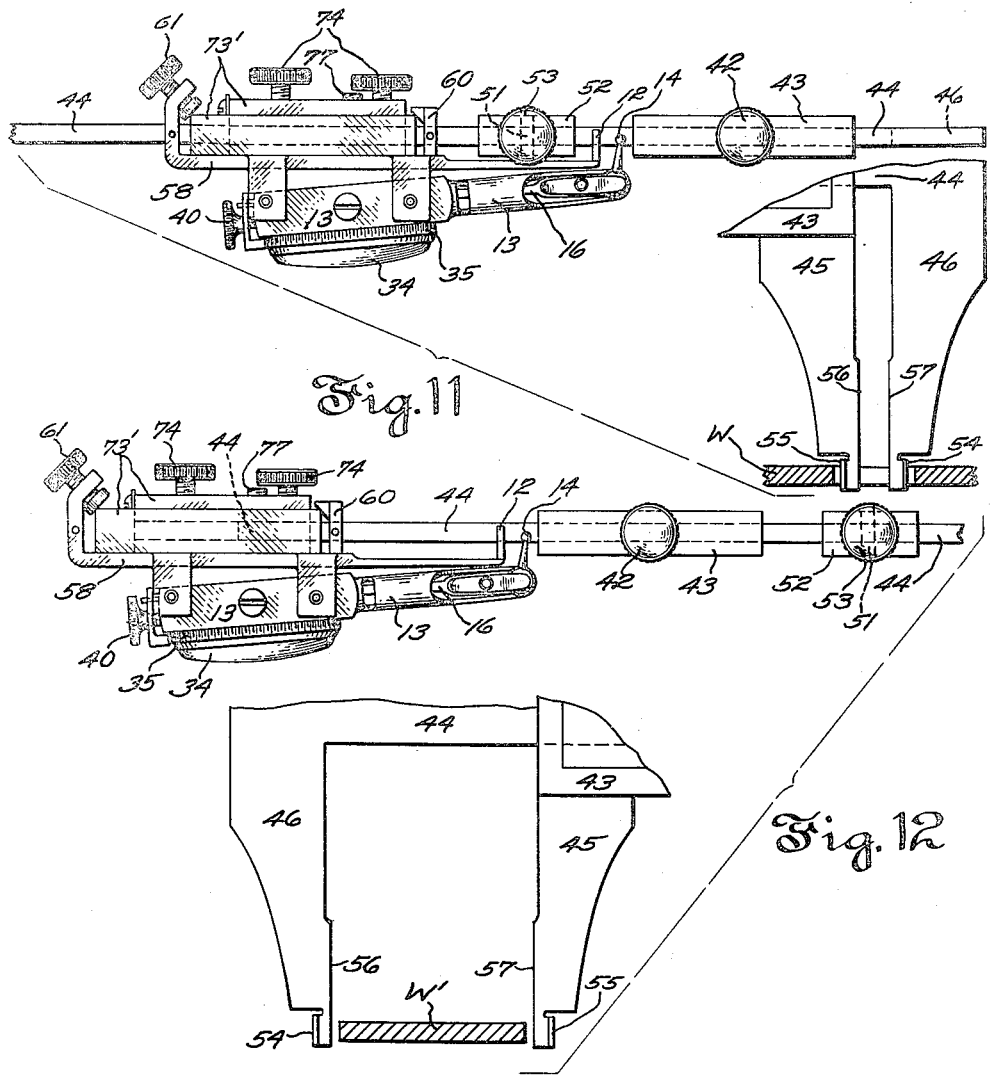

United States Patent Office 2,924,017
Patented Feb. 9, 1960

2,924,017

DIAL INDICATOR ON BEAM CALIPERS WITH PROTECTED CONTACT POINT

George E. Sorensen, Cheshire, Conn.

Application March 15, 1957, Serial No. 646,361

12 Claims. (Cl. 33—147)

This invention relates to dial indicators for testing workpiece dimensions and particularly to dial indicators when used as an adjunct to beam calipers of the type commonly equipped with a vernier scale for indicating measured dimensions with micrometric accuracy. The present improvements are advantageous also when incorporated in dial indicators for general use particularly if employing a swingable contact point.

In former ways of using beam calipers having merely a vernier scale for comparing calipeed work dimensions with a standard dimension great care and close sighting has been involved resulting in eyestrain and loss of time caused by repeatedly reading the many fine graduation lines on a conventional vernier scale following each calipering test of a workpiece. Further than that, mental computation has always been required because the dimension that is ascertained by calipering must be subtracted from some standard dimension or vice versa in order to find the measure of error with the accuracy of vernier reading.

An object of the present improvements is to eliminate the necessity for scanning a fine lined vernior scale in the use of beam calipers as a comparator, particularly when it is not required to know the whole dimension of the workpiece being tested but only the extent of departure of such workpiece dimension from a standard dimension.

A related object is, in testing the accuracy of a workpiece dimension by means of a beam caliper, to cause the measure of dimensional error whether plus or minus to be indicated by a rotary pointer on the circular scale of a dial indicator carried on the beam calipers in a manner to serve in comparison testing as a substitute for the fine measurement indicating vernier scale and with even greater accuracy.

A further object is to avoid interference with the usually needed wide range of relative movement between the calipering legs for following up by successive calipering stages the progressive change in work dimension that accompanies the boring out of a hole or the turning down of a shaft in machining operations, and still avail of the accurate and easily read indication given by a dial indicator as to when a standard dimension has exactly been matched in the progressively varying dimension of the work that is being machined.

A particular object is, in the above proposed and other uses of a dial indicator, to protect the contact point of the indicator against accidental displacement from its established motion transmitting relationship to the dial pointer, which displacement or other form of damaging disturbance might otherwise result from operational impacts or excessive manual pressures imparted to the contact point in the process of sliding the jaw along the beam of the caliper for calipering work. The present improvements afford assured protection of the contact point of the dial indicator against accidental displacement from designed relationship to the pointer actuating mechanism such as might be caused by slippage at some pivotal joint between the parts or by bending or distortion of one or more of the parts that transmit motion to the dial pointer.

A related object is to enable a center-distance finding beam caliper, such as that disclosed in my copending application Serial No. 560,691, filed January 23, 1956, now U. S. Patent No. 2,879,600, issued March 31, 1959, to perform accurate dimension testing operations rapidly on a succession of workpieces.

These and related objectives of the improvements will become clear in further detail from the following description of a successful embodiment of the invention having reference to the appended drawings wherein:

Fig. 8 is a view showing a modification of the arrangement of parts appearing in Fig. 2 for testing outside instead of inside dimensions of a workpiece.

Fig. 9 is an elevation corresponding to Fig. 1 with the parts arranged as in Fig. 8.

Fig. 10 shows in enlarged detail a preferred relationship of contact surfaces cooperative with the contact point of the dial indicator.

Fig. 11 is a composite top and fragmentary side view of a modified beam caliper arranged for inside calipering having the contact point of the dial indicator thrust against by the slidable jaw instead of being carried thereby.

Fig. 12 is a similar composite top and fragmentary side view of a further modified beam caliper showing the parts of Fig. 11 rearranged for outside calipering.

Figure 5:
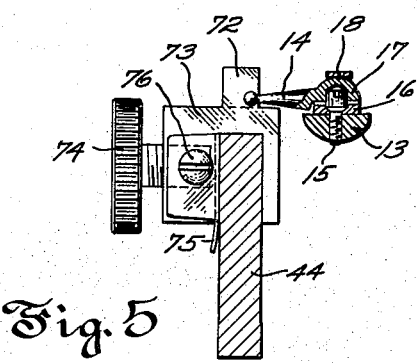
Fig. 5 is a view on a similarly enlarged scale taken in section on the plane 5—5 in Fig. 1, looking in the direction of the arrows.

The improved features of the dial indicator employed in these improvements concern a protective barrier 12 which in any suitable manner and in various forms of construction may be secured in fixed relation to the body casing 13 of the indicator in the close neighborhood of the swingable contact point 14. As shown in Fig. 5 contact point 14 is pivotally mounted at the end of a partially cutaway terminal portion of the hollow body casing 13. A pivot screw 15 fast in the body casing anchors the outer end of a swingable motion transmitting lever 16 to the casing. Contact point 14 has a centrally recessed hub 17 which loosely crowns the head of pivot screw 15 while yieldably clutched in selective angular relationship to lever 16 by face to face slip joint engagement of matingly toothed surfaces on hub 17 and lever 16 constantly held thrust together yieldably by a leaf spring 18. A stud 19 secures spring 18 to lever 16 and permits the spring to swivel to and from a position overlying and bearing axially on hub 17. When swung about stud 19 away from engagement with point hub 17, spring 18 releases the latter for ready removal and replacement by a contact point of different style when desired. Spring 18 can easily be shifted to and away from retaining relation to hub 17 by means of its handle end 20. The mating teeth on hub 17 and lever 16 are shaped to maintain these two parts in constant angular relationship in normal operation of the dial indicator but can cam past each other as permitted by yielding of spring 18 when subjected to a strong force tending to alter the angular relationship of the hub to the lever.

In other words the lever 16 normally swings about pivot screw 15 in unison with contact point 14 for the purpose of converting swinging movement of the latter into rotary movement of the dial pointer 24. The latter is caused to sweep over a circle of graduations 25 on the dial 26 by means of conventional motion transmitting mechanism a typical form of which is disclosed in U.S. Patent No. 1,466,664 to which reference may be had for fuller particulars of the construction and functioning of the mechanical parts of a conventional dial indicator. It will suffice here to mention that an inner offset terminal of lever 16 engages and drives a helical screw track 27 on the stem 28 of dial pointer 24 being normally biased into its limit position shown in Fig. 3 by a cantilever spring wire 29. Wire 29 is anchored fixedly on the inner end of a turn button 30 and can be swung thereby to oppositely inclined stations relatively to the longitudinal axis of casing 13 for reversing the rotary direction in which the wire biases the lever, but this is not a function that is particularly concerned with the present improvements. The outer end of turn button 30 carries an operating arm 31 by means of which spring wire 29 can selectively be so stationed. In Fig. 3 wire 29 biases lever 16 clockwise, in which condition it may be assumed that dial pointer 24 assumes a constant position initially in arbitrary relation to zero on dial 26. Graduations on over-and-under dial 26 may be regarded as "plus" values denoting oversize work as they progress counterclockwise from zero in Fig. 1 and "minus" values denoting undersize work as they progress clockwise from zero. Swinging of lever 16 counterclockwise in unison with contact point 14 responsively to pressure by target abutment 72 in Figs. 1 and 2 will cause pointer 24 to swing counterclockwise in Fig. 1. Always tending to restore pointer 24 in a clockwise direction to its starting position there is a hair spring 32 loosely coiled about stem 28 having its outer end anchored to body casing 13 of the dial indicator. Stem 28 passes freely with clearance through a central hole in dial 26 and has rotary bearing at one of its ends in one wall of the casing 13 and at its other end in a dial retaining disc 33 hereinafter mentioned.

Figure 7:
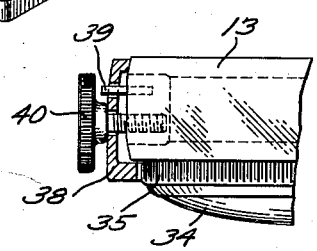
Fig. 7 is an enlarged fragmentary view of a clamp arm shown partially in section on the plane 7—7 in Fig. 2.

Further and conventional mechanical features of the dial indicator include the retention of dial 26 against and in swiveling relation to the body casing 13 by means of retainer disc 33 secured by screws 36 to casing 13 which permits friction opposed rotary adjustment of dial 26 and its mounting ring 37 relatively to the body casing in unison with the crystal 34. The latter is secured to the dial ring 37 by means of a peripherally knurled bezel 35 and covers and protects the dial pointer 24. The bezel has threaded engagement with dial ring 37. The roughened periphery of bezel 35 is clampingly engaged by a detent or clamp lever 38 best shown in Fig. 7 comprising a tiltable lever fulcrumed at one of its ends against the end of body casing 13, loosely guided by a dowel pin 39 and subject to the thrust of a tightening thumb screw 40 threading into the body casing and causing the dogging end of the clamp lever to press lockingly against bezel 35 whereby to stay it against accidental rotary displacement.

Figure 2:
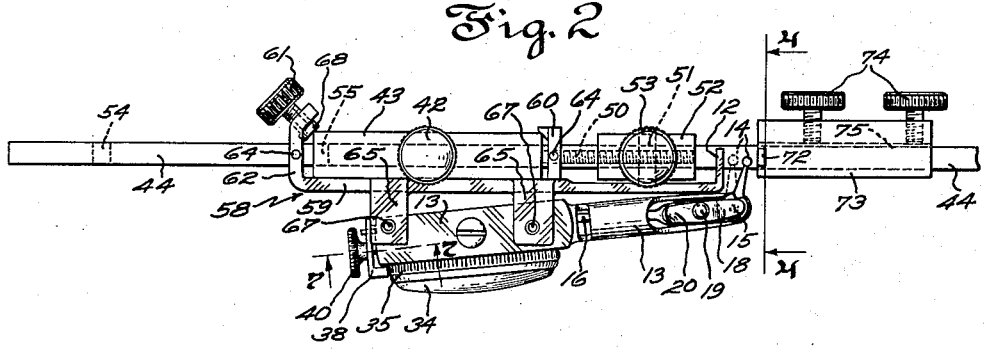
Fig. 2 is a top plan view of the complete instrument of Fig. 1 arranged for testing inside work dimensions.
Figure 1:
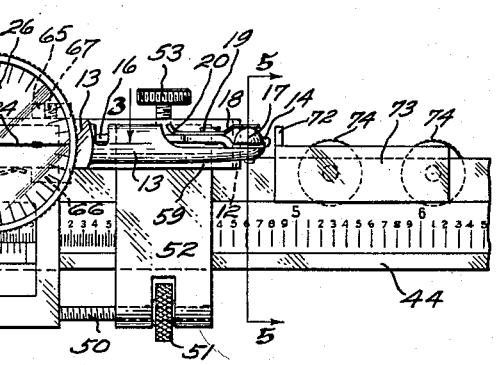
Fig. 1 is an elevation of a conventional beam calipers equipped with a dial indicator and associated fittings embodying the invention.
Figure 3:
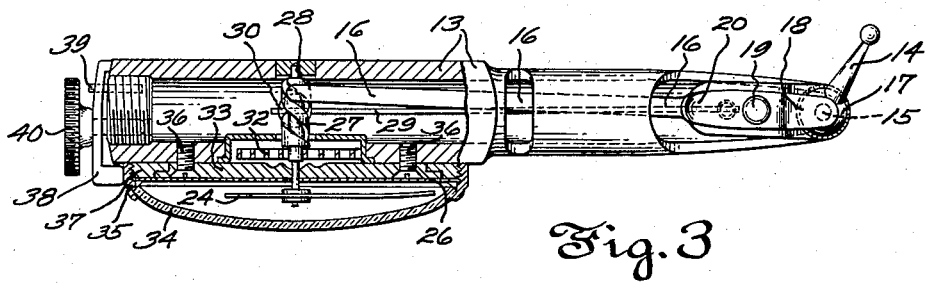
Fig 3 is an enlarged view of the dial indicator alone shown partly in section on the plane 3—3 in Fig. 1, looking in the direction of the arrows.
Figure 4:
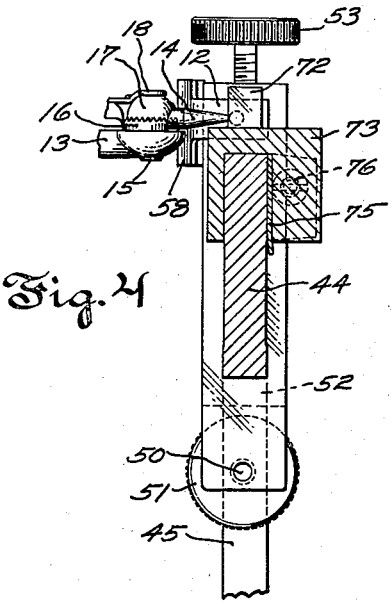
Fig. 4 is a correspondingly enlarged view taken in section on the plane 4—4 in Fig. 2, looking in the direction of the arrows.

A complete dial indicator which may have the above described or equivalent constructions is shown in Figs. 1 and 2 to be mounted on the sliding jaw 43 of a beam 44, carrying calipering legs 45 and 46, respectively, to constitute a conventional beam caliper. The jaw 43 has a conventional window aperture 47 spanned from end to end by the vernier scale 49 which is adapted to register with the regular measuring graduations 48 on the beam. In usual manner a micrometeric control of the adjustive movement of jaw 43 along beam 44 is provided by the feed screw 50 fixed in the jaw and having threaded engagement with a knurled thumb nut 51 that is journaled without axial play in the anchorage block 52. Block 52 in usual manner is free to slide along beam 44 but only when its set screw 53 is loosened. At all other times block 52 is fixed on the beam, in which condition turning of thumb nut 51 causes finely controlled sliding adjustment of jaw 43 along the beam. Jaw 43 can be made fast to beam 44 by means of its set screw 42.

Figure 6:
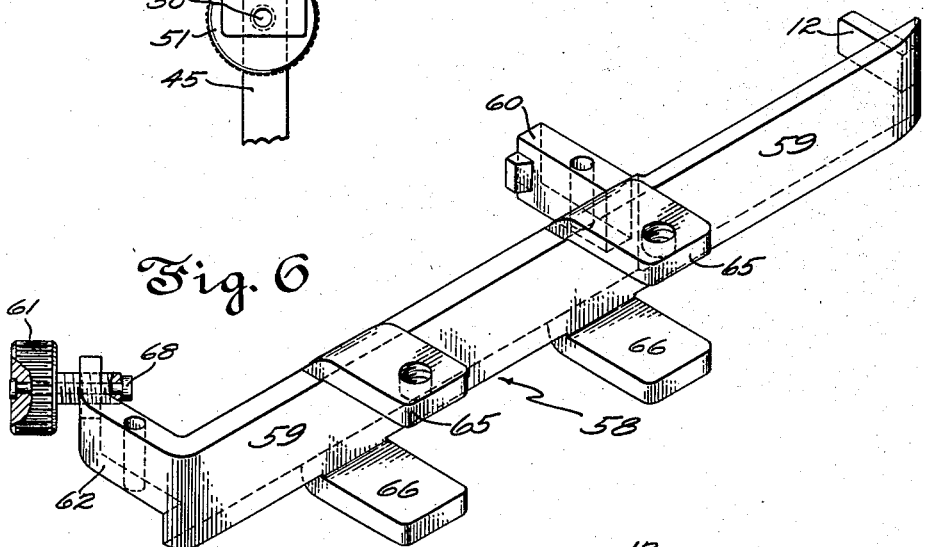
Fig. 6 is an isometric view of a detachable bracket serving to mount the dial indicator on a sliding jaw of the beam calipers.

For purposes which can now be explained the body casing of the dial indicator is fixedly secured to jaw 43 in a choice of positions through the medium of an adapter bracket 58 shown detached from its associated parts in Fig. 6. This bracket comprises a horizontal bar portion 59 which lies in fixed contact with the front face of jaw 43 along the top margin thereof and is held firmly fixed against the jaw through engagement of a lug equipped arm 60 with one corner edge of the jaw in conjunction with a releasable holding screw 61 that bears against the opposite corner edge of jaw 43. Screw 61 threads through a rearward extension 62 of the clamp bracket. Journaled loosely in and extending axially through screw 61 there is a thrust pin 68 having an external head adapted to bear firmly against the rear edge of jaw 43 without turning when the screw is tightened toward the jaw.

At the opposite end of bar portion 59 there projects rearward the before mentioned barrier 12 for preventing excessive swinging of contact point 14 as is further to be explained. Both the rear extensions 60 and 62 contain locating plugs 64 of suitable bearing material extending vertically therethrough and projecting slightly endwise for contact with the top edge of beam 44 to establish and preserve designed alignment therewith of the clamp bracket 58.

An elongate portion of body casing 13 of the dial indicator is rectangular in cross section and is fixedly nested between top lugs 65 and bottom lugs 66 which project forward from the top and bottom edges respectively of adapter bracket 58. At least the two upper lugs 65 contain set screws 67 which bear down against the body casing of the dial indicator and hold it firmly in its fixed relation to adapter bracket 58 as shown in Figs. 1 and 2.

For cooperation with the contact point 14 as the sliding jaw 43 is moved along beam 44 for calipering a workpiece dimension there is provided a target abutment 72 carried fixedly by a saddle 73 mounted astride the top edge of beam 44 and slidably adjustable along the latter. Saddle 73 may be tightened or loosened with respect to the beam by means of set screws 74 which bear against a friction plate 75 intervening between the saddle and a side surface of beam 44. Plate 75 is secured to the saddle by a screw 76.

From the position of parts shown in Fig. 2 it is seen that to swing contact point 14 toward barrier 12 the former can be thrust into engagement with the target abutment 72 by bodily sliding the dial indicator in unison with jaw 43 toward the right in Figs. 1 and 2. Its other or return direction of swinging movement is occasioned by the biasing action of spring wire 29 on lever 16. Contact point 14 may be established in such clutched angular relationship to the dial pointer operating lever 16 that when the latter is positioned at one extreme of its limited swinging movement as shown in Fig. 3 dial pointer 24 assumes its position shown in Fig. 1. The proper clutched relationship is further such that the degree of swinging movement permitted to contact point 14 in counterclockwise direction from its full line position in Figs. 2 and 3 before it encounters barrier 12 is no more than will result in the full angle of swinging movement permitted to lever 16 within body casing 13. Such full angle of lever movement produces one full turn of the indicating pointer 24 counterclockwise from its said position shown in Fig. 1 which may be regarded as a normal range of measurement exhibiting movement of the indicating pointer.

Under these conditions no amount of excess pressure accidentally exerted on contact point 14 toward the left in Figs. 2 or 3 can alter the yieldably maintained angular relationship of point 14 and lever 16 because point 14 will be arrested in its swinging movement by barrier 12 before lever 16 reaches the limit of its swinging movement counterclockwise in Fig. 3. Were barrier 12 not present, bodily movement of the dial indicator toward the right in Fig. 2 accompanying calipering movement of jaw 43 might cause the swinging of point 14 to exceed the ability of lever 16 to follow in unison therewith whereupon slippage would be forced to take place between the matingly engaged notched surfaces of lever 16 and pointer hub 17 which would destroy the set relationship of point 14 and dial pointer 24.

This protection in the angular setting of contact point 14 relative to lever 16 avoids errors in the operation of testing work dimensions which may be carried out as follows. For initially calibrating the instrument the work sensing terminals 54 and 55 on legs 46 and 45 respectively will first be established in calipering engagement with surfaces on a standard workpiece or master gauge known to be spaced apart an accurate dimension which is to serve as a dimensional standard to which production workpieces are required to conform within certain limits of tolerance. Such calibrating operation will establish the sliding jaw 43 at a definite location on beam 44 where it can be fastened by tightening set screw 42. After establishing this calibrated location of jaw 43 the calipers may be removed from the master gauge or standard workpiece. The anchorage block 52 will next be positioned roughly central of the space between barrier 12 and the lug equipped arm 60 by turning thumb nut 51 in suitable direction while its set screw 53 is loosened. Then set screw 53 may be tightened in order to stay anchorage block 52 with respect to beam 44. Saddle 73 is now shoved along the beam 44 toward the left in Figs. 1 and 2 until target abutment 72 engages and swings contact point 14 to a position about midway its permissible extent of swinging movement in unison with lever 16. This permissible extent is angularly exaggerated in Fig. 2 for clarity of disclosure. Lever 16 will thereby be caused to swing counterclockwise in Fig. 2 approximately one half of its total swinging capacity, in other words to a position wherein it is approximately aligned with the longitudinal axis of indicator casing 13. Saddle 73 should then be locked to the beam 44 by tightening its set screws 74 which fixes the position of target abutment 72. Dial adjusting bezel 35 will next be turned to bring the zero graduation on dial scale 26 into exact register with dial pointer 24 whereupon the bezel will be locked in position by tightening brake shoe 38 against the periphery of the bezel by means of thumb screw 40.

The instrument is now in condition for use as a comparator for rapidly testing the dimensional accuracy of successive workpieces that are required to be within specified limits of variation from the standard dimension to which the instrument has been conditioned. It is assumed that the extent of departure of the work dimensions from the standard dimension will not exceed the freedom for movement relative to anchorage block of the gap between arm 60 and barrier 12 of the mounting bracket 58.

To permit work testing calipering movement of sliding jaw 43 its set screw 42 will now be loosened and contact point 14 may be withdrawn from engagement with target 72 by sliding jaw 43 toward the left so that the contact point 14 and dial pointer 24 assume their full line positions shown in Figs. 1 and 2. Workpieces to be tested and which are at least roughly "to dimension" may then be calipered in quick succession by turning thumb nut 51 in either direction until the sensing terminals 54, 55 for inside calipering or terminals 56, 57 for outside calipering lightly contact the work surfaces to be tested. As jaw 43 and the entire dial indicator in unison therewith are moved toward the right for bringing terminals 54, 55 into calipering fit with the workpiece, contact point 14 will ultimately encounter target abutment 72 and will be caused to swing counterclockwise and will rotate dial pointer 24 a proportional number of degrees counterclockwise toward and possibly past zero on the dial scale if the work is oversize. If the work is undersize the pointer will fail to reach zero. The graduations on dial face 26 may be marked to progress in value by thousandths of an inch or by any other dimensional increment away from the zero graduation in each direction of pointer movement in the manner of a conventional over-and-under dial face.

Thus although the vernier scale 49 remains available in cooperation with the measuring graduations 48 on the beam 44 of the conventional beam calipers, it need not be resorted to at all in using the improved instrument as a comparator in testing production workpieces for dimensional accuracy. The needed safeguard against throwing contact point 14 out of yieldingly maintained angular relationship to lever 16 and to the dial pointer 24 is provided by these improvements without causing interference between the anchorage block 52 of a vernier beam calipers and the barrier 12 that prevents accidental excessive swinging of contact point 14.

It will be recognized by those skilled in the art that barrier 12 might comprise an integral projection extending directly from casing 13. Adaptation of the improved dial indicator to the existing parts of different beam calipers, however, becomes more flexible when as disclosed herein the positional relationship of barrier 12 to pivot 15 can be altered to suit circumstances by loosening set screws 67 and shifting the casing 13 bodily between the lugs 65, 66 of bracket 58. Another circumstance favoring separate adjustability of barrier 12 relative to pivot 15 is the need at times of replacing contact point 14 with a substitute point of different dimension or shape.

Figs. 11 and 12 illustrate a modified arrangement of the parts wherein the dial indicator of Fig. 3 and its mounting bracket 58 are not carried on sliding jaw 43 but are carried instead on a modified form of the saddle 73 forming a stationing carrier 73'. The body of carrier 73' receives and is fitted by bracket 58 as was jaw 43 in Figs. 2 and 8. In this arrangement of the parts the target abutment 72 of Figs. 1–5 may be omitted because the contact point 14 of the dial indicator is positioned for direct sensing contact with one end of jaw 43. For inside calipering, i.e. spanning the diameter of a hole or the space between two mutually facing surfaces of a workpiece such as W in Fig. 11, the contact point 14 and its protective barrier 12 may occupy and operate in the space between sliding jaw 43 and its anchorage block 52. For outside calipering, i.e. spanning the diameter of a shaft or the distance between two surfaces of a workpiece facing in opposite directions such as W' in Fig. 12, the anchorage block 52 may operate at the end of jaw 43 opposite from the contact point 14 and barrier 12. This arrangement permits as wide separation between the sliding jaw 43 and the dial indicator as is possible to the arrangement in Figs. 1, 2, 8 and 9.

In Fig. 11 the pointer 24 of the dial indicator is caused to swing from its normal "zero minus" position shown in Fig. 1 to "zero" position, or therebeyond to a "zero plus" position, on scale 26 when the sliding jaw 43 is moved to the left toward carrier 73' by turning thumb nut 51 in a direction to separate leg 45 from leg 46. In thus performing inside calipering of the workpiece W, the carrier 73' and the anchorage block 52 remain adjustably locked to the beam 44 by their respective set screws 53 and 74 or 77.

In Fig. 12 the pointer 24 is caused to swing similarly when the sliding jaw is moved to the left toward carrier 73' by turning thumb nut 51 in a direction to cause leg 45 to approach leg 46. In thus performing outside calipering of the workpiece W', the carrier 73' and the anchorage block 52 remain adjustably locked to the beam 44 as aforesaid.

If the lever 16 is connected in non-changeable bellcrank relationship to contact point 14 without provision for slippage therebetween angularly at the hub 17 the benefit of barrier 12 will be to prevent distortion or strain in such bell-crank structure when the contact point is swung too strongly toward the left in Fig. 2 or too strongly toward the right in Fig. 8 by encountering the target abutment 72. Fig. 10 illustrates diagrammatically how the preferred arrangement entirely eliminates forces that otherwise could produce a mechanical couple tending to swing the axis of contact point 14 in any direction as a consequence of the equal and opposed forces (B) and (T) exerted respectively by barrier 12 and target 72 against opposite spherical surfaces of the ball-shaped end of the contact point. There are convex contours other than that of a spherical ball which will produce equivalent protection against the setting up of any mechanical couple urging the contact point to swing other than about pivot 15. The curvatures should be such that the opposed forces B and T in Fig. 10 are caused to act in a common line that is normal to the curvatures of the surfaces of the contact point where pressed against by barrier 12 and target 72.

As heretofore indicated the bodily positioning of the dial indicator on the beam calipers illustrated in Figs. 1 to 7 enables all parts including the anchorage block 52 which slide along beam 44 in unison with calipering leg 45 to be widely separated from the target abutment 72 when starting to bore a hole that will be calipered roughly in separate stages between successive cuts by moving leg terminal surface 55 toward the right as the hole becomes larger and larger. This is termed "inside" calipering. As the hole approaches its ultimate correct size contact point 14 will arrive ultimately in engagement with abutment 72 for causing a final accurate indication to be given by pointer 24 on indicator dial 26 as to when the hole has attained the exact standard size. If however the machining operation were the turning down of a shaft to be accompanied by correspondingly repeated test measurements, the calipering leg 45 would need to be moved in successive stages toward the left in Figs. 1 and 2 in order to follow up the progressive diminishing of size of the shaft with successive cuts. For this purpose the parts of the instrument are constructed so that the whole dial indicator and its mounting bracket 58 can be shifted to the different position on caliper jaw 43 shown in Figs. 8 and 9. Here the contact point is adapted to advance toward the left instead of toward the right in order to engage the target abutment 72 whose carrying saddle 73 now is on the opposite side of jaw 43 from that shown in Figs. 1 to 7. This modified arrangement provides for a wide withdrawal of calipering leg 45 toward the right away from leg 46 when starting to machine a solid workpiece to a reduced size such as a shaft whose diameter at the beginning of each cut will be calipered roughly in successive stages by reducing the space between work contacting terminal surfaces 56 and 57 as the shaft becomes smaller and smaller. This is termed "outside" calipering. As the diameter of the shaft approaches its ultimate correct size contact point 14 will arrive in engagement with abutment 72 for giving a final accurate indication by means of pointer 24 and indicator dial 26 as to when the shaft has attained the exact standard size, namely when pointer 24 registers at zero.

Attention is called in Figs. 8 and 9 to the ability to set the saddle 73 on beam 44 so that target abutment 72 is in outboard relation to the extreme left end of the beam. To provide an extra strong fixity of the saddle on the beam in this condition I may use a headless or socket head set screw 77 that can be located more closely to one of the thumb screws 74 than can the other thumb screw 74.

The adapter bracket 58, or some mechanical equivalent therefor, can be employed with the advantages hereinbefore explained as a means for removably and/or adjustably holding the dial indicator of my aforesaid copending patent application, Serial No. 560,691, either first on a sliding jaw of the center distance testing beam calipers as illustrated in Figs. 10 to 13 of that application, or second on the saddle that slides adjustably directly on the scale beam of that application as illustrated in Figs. 1 to 7. So arranged, the sensing or contact point of such dial indicator will be protected by either a barrier like 12 herein in the first instance, or by locating it in sufficiently close permanent proximity to an obstructing surface of the saddle that carries the dial indicator in the second instance. As explained in said copending application, for center distance testing by use of the circular scale of graduation on face 26 of the indicator dial the graduations thereof will be so denominated as to dimensional values that the degree of rotary movement of pointer 24 that takes place responsively to bodily movement of contact point 14 toward target abutment 72 will cause the pointer to sweep over the dial face to a graduation denoting a linear distance equal to only half the actual extent of simultaneous bodily movement of the calipering jaw 43 along the scale beam.

All of the foregoing and other alterations or reversals of the locations and functioning of the parts, as well as all obvious variants of the particular shape and relationship of parts herein shown, are contemplated and intended to be covered within the scope of the invention as defined by the appended claims.

I claim:

1. A dial indicator comprising, a variably mountable instrument frame, a contact point pivotally carried in projecting position by said frame adapted for swinging movement relative thereto, an indicator for exhibiting linear measurement pivotally mounted on said frame for measurement exhibiting movement in at least one rotary direction, connections arranged to transmit impelling motion from said contact point to said indicator, means establishing a normal range of measurement exhibiting movement through which said indicator can be impelled by said connections and limiting said indicator to said range of movement, means yieldably biasing said contact point in a direction to urge said indicator toward one limit of its said range of movement, and a protective barrier stationed in relation to said frame in the path of swinging movement of said contact point in a direction opposing to the first said direction and in position to arrest said contact point at a predetermined station in said path while said indicator is within its said normal range of movement.

2. The combination with a beam caliper including a first calipering leg fixed on the scale beam of the caliper and a jaw slidable along said beam carrying a cooperative calipering leg, of a dial indicator carried by said jaw having a body frame and a contact point projecting movably therefrom, a target abutment carried by said beam independently of said jaw in position to be encountered by and displace said contact point as said jaw moves toward said abutment along said beam, and a barrier cooperatively arranged in relation to said contact point and to said target abutment in a manner to limit the extent of displacement of said contact point consequent to movement of said jaw toward abutment.

3. The combination defined in claim 2, together with a saddle mechanically independent of the said jaw slidably adjustable along said beam and carrying the said target abutment.

4. The combination defined in claim 2, together with an anchorage block fastenable adjustably on the said beam between the said jaw and the said target abutment having screw impelling connection with said jaw.

5. The combination defined in claim 2, in which the said contact point is swingable in relation to the said body frame, and said barrier is stationed in relation to the said jaw in the path of swinging movement of said contact point in position to oppose thrust of the said target abutment against said contact point at a predetermined point in said swinging movement of the latter.

6. The combination defined in claim 2, in which the said contact point is swingable in relation to the said body frame, together with an adapter bracket of shape and size to fit and be fastened removably to the said jaw and carrying said body frame, and said barrier is carried by said bracket in the path of swinging movement of said contact point in position to oppose thrust of said target abutment against said contact point at a predetermined point in the swinging movement of the latter.

7. The combination defined in claim 6, in which the said body frame of the said dial indicator is mounted adjustably on the said adapter bracket in a manner to permit altering of the bodily position of the said contact point relatively to both the said target abutment and the said barrier.

8. The combination with beam calipers comprising a scale beam having slidably mounted thereon a hollow calipering jaw having marginal walls in flanking relation to said beam, an adapter bracket equipped with mounting extensions at least in part encompassing and fitting said walls and with fastening means engaging said walls in a manner to clamp said bracket fixedly and removably on said jaw, said bracket carrying shelf structure projecting laterally away from said beam, and a dial indicator having a body frame firmly lodged on said shelf structure alongside said beam to be slidable relatively thereto in unison with said jaw, said fastening means comprising a screw threading through one of said mounting extensions and bearing endwise against a corner edge of said marginal walls of said calipering jaw.

9. The combination with beam calipers comprising a scale beam having slidably mounted thereon a hollow calipering jaw having marginal walls in flanking relation to said beam, an adapter bracket equipped with mounting extensions at least in part encompassing and fitting said walls and with fastening means engaging said walls in a manner to clamp said bracket fixedly and removably on said jaw, said bracket carrying shelf structure projecting laterally away from said beam, and a dial indicator having a body frame firmly lodged on said shelf structure alongside said beam to be slidable relatively thereto in unison with said jaw, said adapter bracket being elongate and substantially symmetrical with respect to its longitudinal axis, and said axis lying in a common plane with the central axis of said dial indicator, wherefore said bracket and dial indicator can be carried by said calipering jaw in either of relatively inverted positions without appreciably changing the location of said contact point transversely of said beam.

10. The combination with beam calipers comprising a scale beam having slidably mounted thereon a hollow calipering jaw having marginal walls in flanking relation to said beam, an adapter bracket equipped with mounting extensions at least in part encompassing and fitting said walls and with fastening means engaging said walls in a manner to clamp said bracket fixedly and removably on said jaw, said bracket carrying shelf structure projecting laterally away from said beam, and a dial indicator having a body frame firmly lodged on said shelf structure alongside said beam to be slidable relatively thereto in unison with said jaw, said dial indicator including a dial face rotatably attached to a bezel mounted to be adjustable on the said body frame, together with a releasable detent clamp carried by said body frame shiftable between bezel engaging position and bezel freeing position, whereby respectively to prevent and permit rotary shifting of said dial face.

11. The combination with beam calipers comprising a scale beam having slidably mounted thereon a hollow calipering jaw having marginal walls in flanking relation to said beam, an adapter bracket equipped with mounting extensions at least in part encompassing and fitting said walls and with fastening means engaging said walls in a manner to clamp said bracket fixedly and removably on said jaw, said bracket carrying shelf structure projecting laterally away from said beam, and a dial indicator having a body frame firmly lodged on said shelf structure alongside said beam to be slidable relatively thereto in unison with said jaw, together with an anchorage block having means to station the same in selected set positions along the said beam and having screw impelling connection to the said calipering jaw, said dial indicator including a swingable contact point carried in outboard relation to said mounting extensions of said adapter bracket, and said bracket extending past said anchorage block and presenting a barrier to the swinging movement of said contact point between the latter and said anchorage block.

12. A dial indicator comprising, a variably mountable instrument frame, a contact point pivotally carried in projecting position by said frame adapted for swinging movement relative thereto and including a terminal presenting oppositely facing lateral surfaces of convex contour, an indicator for exhibiting linear measurement pivotally mounted on said frame for measurement exhibiting movement in a rotary direction, connections arranged to transmit impelling motion from said contact point to said indicator, means establishing a normal range of measurement exhibiting movement through which said indicator can be impelled by said connections in said direction, a barrier stationed in relation to said frame in the path of swinging movement of said contact point in position to arrest the latter at a predetermined position while said indicator is within its said normal range of movement, together with a force exerting body located to be encountered by and press against said terminal in such direction toward said barrier that opposed forces of said barrier and said body against said convex surfaces act in a common line that is normal to the contours of both of said oppositely facing surfaces.

References Cited in the file of this patent

UNITED STATES PATENTS

| | | |
|---|---|---|
| 1,466,664 | Lowe | Sept. 4, 1923 |
| 2,447,612 | Dowe | Aug. 24, 1948 |

FOREIGN PATENTS

| | | |
|---|---|---|
| 584,462 | Great Britain | Jan. 15, 1947 |

OTHER REFERENCES

Niedt, publication in "American Machinist," page 136, April 25, 1946, 33–147J. (Copy in Library.)